(12) United States Patent
Yu

(10) Patent No.: US 9,986,335 B2
(45) Date of Patent: May 29, 2018

(54) SOUND-MODULATING DEVICE

(71) Applicant: YI SHENG CO., LTD., Taoyuan (TW)

(72) Inventor: Jen-Fang Yu, Taoyuan (TW)

(73) Assignee: YI SHENG CO., LTD., Taoyuan (TW)

( * ) Notice: Subject to any disclaimer, the term of this patent is extended or adjusted under 35 U.S.C. 154(b) by 0 days. days.

(21) Appl. No.: 15/581,302

(22) Filed: Apr. 28, 2017

(65) Prior Publication Data

US 2017/0229107 A1 Aug. 10, 2017

Related U.S. Application Data

(63) Continuation-in-part of application No. 15/138,598, filed on Apr. 26, 2016, now Pat. No. 9,641,936.

(30) Foreign Application Priority Data

Apr. 27, 2015 (TW) .............................. 104113445 A

(51) Int. Cl.
| | |
|---|---|
| *G10K 11/16* | (2006.01) |
| *H03B 29/00* | (2006.01) |
| *H04R 3/04* | (2006.01) |
| *G06F 3/16* | (2006.01) |
| *H04R 29/00* | (2006.01) |

(52) U.S. Cl.
CPC .............. *H04R 3/04* (2013.01); *G06F 3/165* (2013.01); *G10K 11/1783* (2018.01); *G10K 11/17873* (2018.01); *H04R 29/00* (2013.01); *G10K 2210/104* (2013.01); *G10K 2210/1054* (2013.01); *G10K 2210/113* (2013.01); *G10K 2210/511* (2013.01); *H04R 2410/05* (2013.01)

(58) Field of Classification Search
CPC ....... G10K 11/1784; G06F 3/165; H04R 3/04; H04R 29/00
See application file for complete search history.

(56) References Cited

U.S. PATENT DOCUMENTS

| | | | |
|---|---|---|---|
| 6,079,162 A  * | 6/2000 | Hein ......................... | E06B 3/50 49/1 |
| 2006/0055534 A1* | 3/2006 | Fergusson ............ | G01D 5/2405 340/562 |
| 2007/0182550 A1* | 8/2007 | Castello ............... | B61D 19/026 340/541 |
| 2009/0103752 A1* | 4/2009 | Chou ..................... | H03G 5/005 381/107 |
| 2010/0039106 A1 | 2/2010 | Edelstein | |
| 2010/0173783 A1 | 7/2010 | Fermon et al. | |
| 2010/0307320 A1* | 12/2010 | Hoeberechts ........ | G10H 1/0025 84/600 |
| 2011/0102169 A1* | 5/2011 | Orbach .................. | B60N 2/002 340/457 |
| 2013/0278422 A1* | 10/2013 | Friedman ............. | G08B 13/196 340/541 |

(Continued)

*Primary Examiner* — Simon King
(74) *Attorney, Agent, or Firm* — WPAT, PC

(57) ABSTRACT

A sound-modulating device used in a confined space is provided. The sound-modulating device includes an event detector and an audio module in communication with each other. The event detector detects an event and generates a trigger signal in response to the detected event. The audio module plays a music segment in response to the trigger signal. The frequencies of the music segment range from 20 Hz to 20000 Hz. The intensities of the music segment are smaller than or equal to 75 dB.

15 Claims, 4 Drawing Sheets

(56) References Cited

U.S. PATENT DOCUMENTS

| | | | |
|---|---|---|---|
| 2015/0058802 A1* | 2/2015 | Turaj | H04L 41/22 715/810 |
| 2015/0259968 A1* | 9/2015 | Beckman | E05G 1/005 109/38 |
| 2016/0035196 A1* | 2/2016 | Chan | H04W 4/028 340/541 |
| 2016/0111078 A1 | 4/2016 | Barath et al. | |

* cited by examiner

SOUND-MODULATING DEVICE

CROSS-REFERENCE TO RELATED APPLICATIONS

The present application is a continuation-in-part application claiming benefit from a pending U.S. patent application bearing a Ser. No. 15/138,598 and filed Apr. 26, 2016, contents of which are incorporated herein for reference.

FIELD OF THE INVENTION

The present invention relates to a sound-modulating device, and more particularly to a sound-modulating device used in confined spaces.

BACKGROUND OF THE INVENTION

Nowadays, the increasing demands for high indoor environmental quality such as sound quality inside the housing can not be ignored. However, in a densely populated city, the indoor sound quality is seriously affected due to various indoor and outdoor noise sources. No practicable device has been developed to solve this problem.

Therefore, there is a need to provide a sound-modulating device to effectively eliminate the adverse influence.

SUMMARY OF THE INVENTION

The present application provides a sound-modulating device for relieving feeling, eliminating low-frequency noise and/or repelling people in confined spaces.

In accordance with an aspect of the present disclosure, a sound-modulating device used in a confined space is provided. The sound-modulating device includes an event detector and an audio module in communication with the event detector. The event detector detects an event and generates a trigger signal in response to the detected even. The audio module plays a music segment in response to the trigger signal. The frequencies of the music segment range from 20 Hz to 20000 Hz and the intensities of the music segment are smaller than or equal to 75 dB.

In an embodiment, the event detector includes a motion detector for detecting whether a client is present in the confined space. The event represents that at least one client is present in the confined space.

In an embodiment, the confined space is an elevator cage. The event detector includes a motion detector and a timer. The motion detector detects whether a client is present in the elevator cage. The timer detects a door closing time. The event represents that at least one client is present in the elevator cage and the door closing time exceeds a predetermined time period.

In an embodiment, the event detector informs the audio module to stop playing the music segment after the event ends.

In an embodiment, the audio module includes a speaker, a storage unit and an audio player module. The storage unit stores at least one music file. The audio player module is in communication with the event detector, the storage unit and the speaker. The audio player module selects and receives one music file from the storage unit and plays the music segment corresponding to the music file through the speaker in response to the trigger signal generated by the event detector.

In an embodiment, the sound-modulating device further includes a low-frequency noise detector and an automatic actuator. The low-frequency noise detector detects low-frequency noise and generates a first modulating signal in response to the detected low-frequency noise. The automatic actuator issues a second modulating signal in response to a predetermined state. The audio module is in communication with the low-frequency noise detector and the automatic actuator. The audio module generates a low-frequency audio signal for eliminating the low-frequency noise in response to the first modulating signal and generates a high-frequency repellent audio signal in response to the second modulating signal. The low-frequency audio signal has a frequency ranging from 20 Hz to 350 Hz, while the high-frequency repellent audio signal has a frequency not less than 8000 Hz.

In an embodiment, the first modulating signal generated by the low-frequency noise detector and the low-frequency noise have similar waveforms in antiphase.

In an embodiment, the automatic actuator includes a motion detector for detecting whether an object is moving within a specific region and generating the second modulating signal if the predetermined state is met according to the detected moving object.

In an embodiment, the automatic actuator includes a timer for issuing the second modulating signal if the predetermined state representing a specific period of time is met.

In an embodiment, the audio signal generator includes an amplifier circuit and a speaker. The high-frequency repellent audio signal has an intensity not greater than 60 dB.

In an embodiment, the sound-modulating device further includes a low-frequency noise detector. The low-frequency noise detector detects low-frequency noise and generates a first modulating signal in response to the detected low-frequency noise. The audio module generates a low-frequency audio signal for eliminating the low-frequency noise in response to the first modulating signal. The low-frequency audio signal has a frequency ranging from 20 Hz to 350 Hz.

In an embodiment, the sound-modulating device further includes an automatic actuator. The automatic actuator issues a second modulating signal in response to a predetermined state. The audio module generates a high-frequency repellent audio signal in response to the second modulating signal. The high-frequency repellent audio signal has a frequency not less than 8000 Hz and an intensity not greater than 60 dB.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
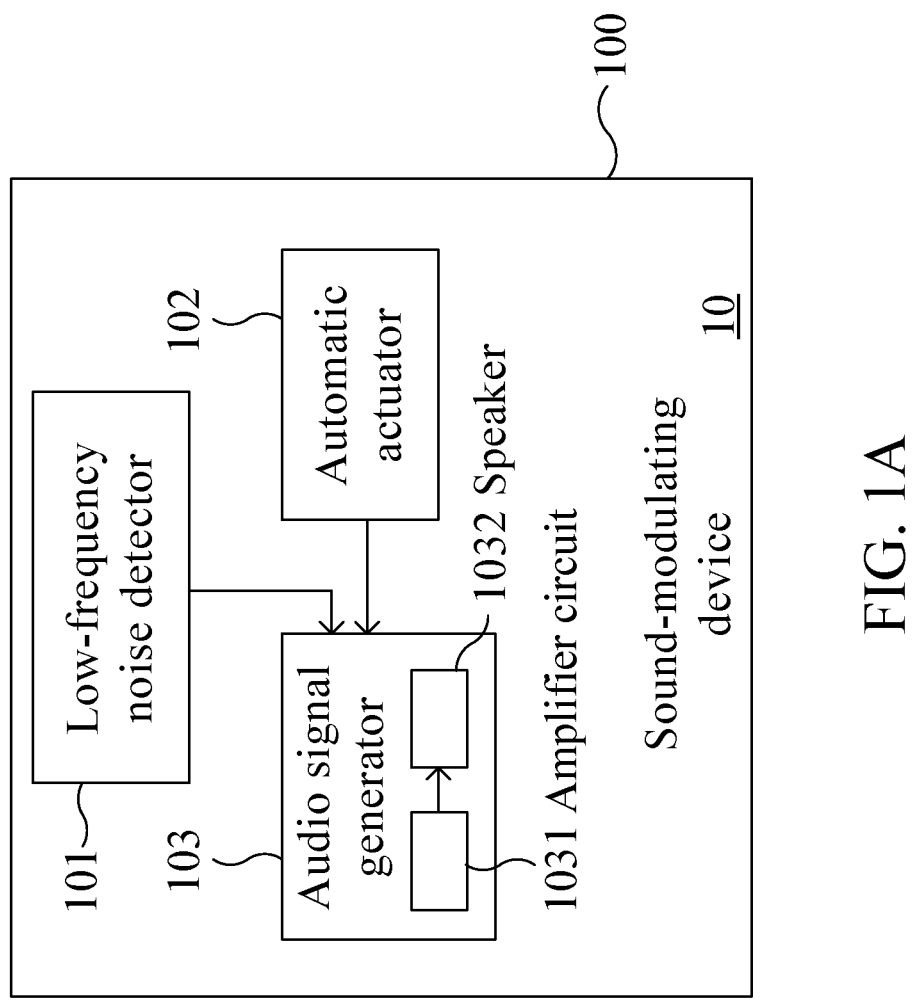
FIG. 1A is a functional block diagram illustrating a sound-modulating device according an embodiment of the present disclosure.
Figure 1B:
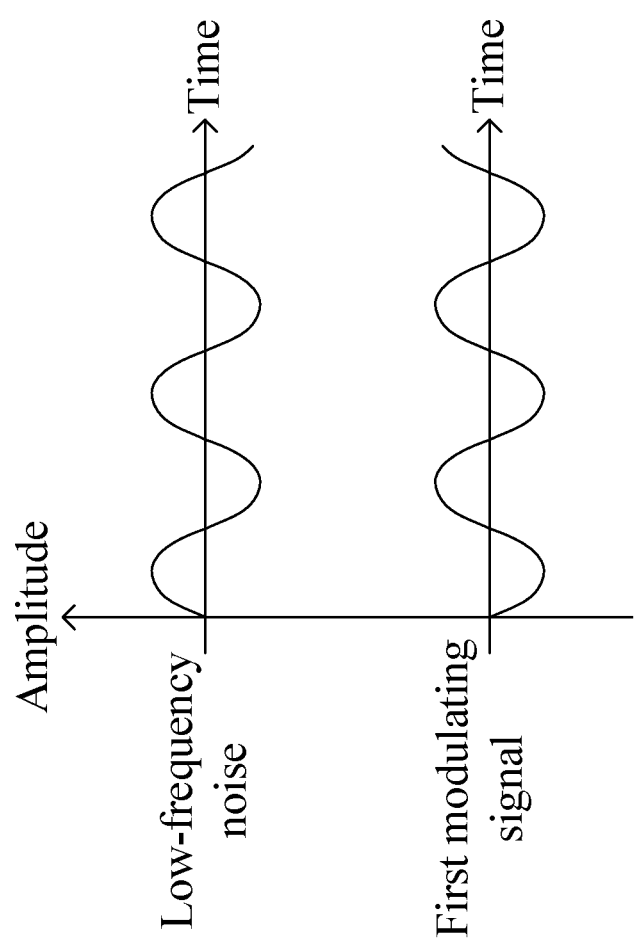
FIG. 1B illustrates waveforms of a first modulating signal generated by the low-frequency noise detector and low-frequency noise.

Please refer to FIG. 1A, a functional block diagram illustrating a sound-modulating device according an embodiment of the present disclosure. The sound-modulating device 10 mainly includes a low-frequency noise detector 101, an automatic actuator 102 and an audio signal generator 103. The low-frequency noise detector 101, the automatic actuator 102 and the audio signal generator 103 may be disposed in a single housing 100. The low-frequency noise detector 101 detects low-frequency noise and generates a first modulating signal in response to the detected low-frequency noise. The first modulating signal and the detected low-frequency noise have similar waveforms but they are in antiphase. The waveforms are exemplified in FIG. 1B. The automatic actuator 102 generates a second modulating signal in response to a predetermined state. The audio signal generator 103 is in communication with the low-frequency noise detector 101 and the audio signal generator 103. The audio signal generator 103 may include an amplifier circuit 1031 and a speaker 1032. The audio signal generator 103 generates a low-frequency audio signal for eliminating the low-frequency noise in response to the first modulating signal. The low-frequency audio signal and the detected low-frequency noise have similar waveforms but they are in antiphase. The low-frequency audio signal has a frequency ranging from 20 Hz to 350 Hz. The audio signal generator 103 further generates a high-frequency repellent audio signal in response to the second modulating signal. The high-frequency repellent audio signal has a frequency not less than (greater than or equal to) 8000 Hz and an intensity not greater than (smaller than or equal to) 60 dB. The low-frequency audio signal can eliminate the low-frequency noise by destructive interference to provide a quiet interior environment. The indoor low-frequency noise may involve operation of air conditioning or refrigerators and automobiles/motorcycles on streets. The high-frequency repellent audio signal can make nearby people feel uncomfortable and urge them to leave the area.

Figure 2:
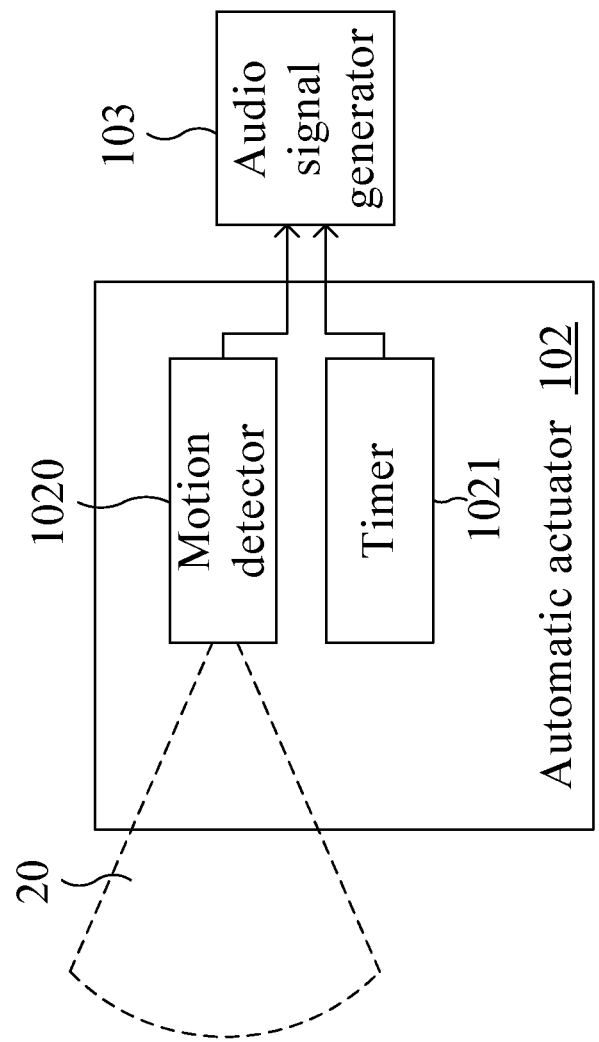
FIG. 2 is a functional block diagram illustrating an automatic actuator of the sound-modulating device according to the present disclosure.

Please refer to FIG. 2, a functional block diagram illustrating the automatic actuator of the sound-modulating device according to the present disclosure. The automatic actuator 102 mainly includes a motion detector 1020 and a timer 1021, both of which are in communication with the audio signal generator 103. The motion detector 1020 detects whether a moving object presents within a specific region 20. A first predetermined state represents that a moving object is detected. If an object is moving within the specific region (detected region) 20 and detected by the motion detector 1020, the detection result meets the first predetermined state and the motion detector 1020 generates the second modulating signal. Specifically, the motion detector 1020 may be implemented with an infrared (IR) sensor, an ultrasonic sensor or video monitoring system with image analysis function. When someone is moving within the detected region 20, the motion detector 1020 actively issues the second modulating signal to drive the audio signal generator 103 to generate the high-frequency repellent audio signal so as to make him or her uncomfortable and urge him or her to leave the area. Thus, the sound-modulating device 10 further has anti-theft effect. A second predetermined state represents a specific period of time. In the specific period of time, the timer 1021 judges that the second predetermined state is met and issues the second modulating signal to drive the audio signal generator 103 to generate the high-frequency repellent audio signal. For example, the specific period of time is half an hour before closing hours of a public place, e.g. restaurant or store. Thus, the sound-modulating device 10 will automatically generate the high-frequency repellent audio signal before the closing time to make the customers to leave the place much quickly and efficiently. The high-frequency repellent audio signal has a frequency not less than 8000 Hz and an intensity not greater than 60 dB. The high-frequency repellent audio signal may be shown as any proper kind of sound. Furthermore, the controlled intensity of the high-frequency repellent audio signal will not frighten or scare the customers. In an embodiment, the automatic actuator 102 of the present disclosure may include only one of the motion detector 1020 and the timer 1021. The detailed structure, operation and principle of this embodiment are not described again.

In another embodiment, the sound-modulating device 10 includes the low-frequency noise detector 101 and the audio signal generator 103, but the automatic actuator 102 is omitted. In this condition, the sound-modulating device 10 can eliminate the low-frequency noise.

In another embodiment, the sound-modulating device 10 includes the automatic actuator 102 and the audio signal generator 103, but the low-frequency noise detector 101 is omitted. In this condition, the sound-modulating device 10 can automatically actuate the repellent function.

Figure 3:
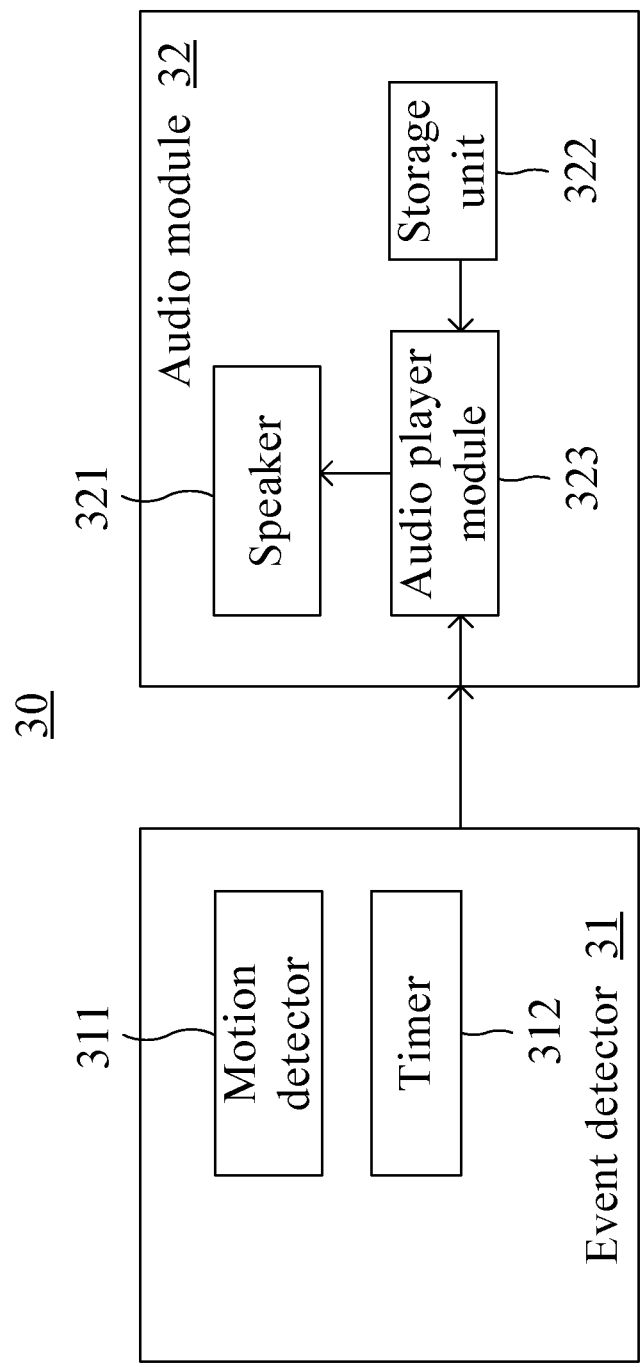
FIG. 3 is a functional block diagram illustrating a sound-modulating device according to another embodiment of the present disclosure.

The present disclosure is further developed to be used in confined spaces, e.g. elevator cage. When a breakdown occurs on the elevator and somebody is trapped inside the cage, the trapped client usually feels ill or nervous during the breakdown of the elevator. Another sound-modulating device is provided for this situation. Please refer to FIG. 3, a functional block diagram illustrating a sound-modulating device according to another embodiment of the present disclosure. The sound-modulating device 30 mainly includes an event detector 31 and an audio module 32 in communication with each other. The event detector 31 and the audio module 32 may be disposed in a single housing (not shown) or separately provided and communicated with each other through cable or wireless channel. The event detector 31 detects a specific event and issues a triggering signal to the audio module 32 once the specific event is detected by the event detector 31. The audio module 32 repeatedly plays a music segment in response to the triggering signal. Soft or pleasing music segment is preferred. Frequencies of the music segment range from 20 Hz to 20000 Hz and intensities of the music segment are not greater than (smaller than or equal to) 75 dB. Therefore, the played music segment can pacify and calm the trapped client before the elevator fault is eliminated to relieve discomfort or prevent from unpleasant effects.

The specific event may be defined according to different requirements. For example, the event may be defined to represent that there is at least one client inside the elevator cage. An optional condition (e.g. the elevator door is closed) may be introduced into the event. This event is especially defined for a person suffering from claustrophobia and fearing of being enclosed in a small space. Once the specific event occurs and is detected, the audio module 32 is triggered to continuously and repeatedly play the music segment till the event ends. In other words, when no client is detected inside the elevator cage, the event detector 31 informs the audio module 32 to stop playing the music segment. If the optional condition is introduced, the event ends once no client is detected inside the elevator cage or the elevator door is open.

In another embodiment, the event may be defined to represent that the elevator door is not fully open during a predetermined time period after a client enters the elevator cage. This event may result from abnormal situations, e.g. elevator breakdown or power failure wherein these situations will make the client nervous or upset. As described above, once the specific event occurs, the audio module 32 is triggered to continuously and repeatedly play the music segment till the event ends. In other words, when there is no client inside the elevator cage or the elevator door is open, the event detector 31 informs the audio module 32 to stop playing the music segment.

In an embodiment, the event detector 31 includes a motion detector 311. The motion detector 311 detects whether any client is present in the elevator cage. Specifically, the motion detector 311 may be implemented with an infrared sensor, an ultrasonic sensor or video monitoring system with image analysis function. If at least one client is present in the elevator cage, the event detector 311 generates the triggering signal to actuate the audio module 32. After the actuation, if no client is detected in the elevator cage, the event detector 311 informs the audio module 32 to stop the playing action. Optionally, the motion detector 311 directly detects the operation state (open or closed) of the elevator door or accesses the operation state from a control circuit board (not shown) of the elevator so as to introduce optional condition into the event.

The event detector 31 may further include a timer 312. The timer 312 detects and monitors whether the door closing time exceeds a predetermined time period, e.g. 3 minutes. Therefore, the event detector 31 can issue the triggering signal to actuate the audio module 32 to play the music segment or inform the audio module 32 to stop playing the music segment according to the detection by the motion detector 311 and/or the timer 312.

The audio module 32 includes a speaker 321, a storage unit 322 and an audio player module 323. The storage unit 322 stores at least a music file representing the music segment. The audio player module 323 receives a music file from the storage unit 322 and outputs a corresponding audio signal through the speaker 321 in response to the triggering signal. If more than one music file is stored in the storage unit 322, the audio player module 323 may randomly or sequentially select one of the music files.

The present disclosure may be applied to other confined spaces, e.g. tunnel, cabin of aircraft, to pacify or calm passengers. Furthermore, the components of different embodiments may be combined or integrated to provide a multi-functional sound-modulating device. In other words, the sound-modulating device can perform functions of relieving feeling and eliminating low-frequency noise and/or repelling persons. In one embodiment, when low-frequency noise is detected in the elevator cage, the audio signal generator or the audio module generates the low-frequency audio signal for eliminating the low-frequency noise in response to the first modulating signal, as described in the above embodiments. In another embodiment, when a client stays in the elevator cage which has stopped at the initial floor or the goal floor for a predetermined time period because the client is talking or using mobile phone without paying much attention to surroundings, the audio signal generator or the audio module generates the high-frequency repellent audio signal to repel or warn the client in response to the second modulating signal, as described in the above embodiments. The detailed structure, operation and principle can be derived from the embodiments with reference to FIGS. 1A, 1B and 2, and are not repeated herein. Furthermore, the motion detectors 1020 and 311 may be independently provided in the sound-modulating device or integrated as one motion detector. Similarly, the timers 1021 and 312 may be independently provided in the sound-modulating device or integrated as one timer. Therefore, the automatic actuator 102 and the event detector 31 can be integrated together.

It is to be noted that the present disclosure is not limited to the above-described embodiments. The sound-modulating device may be integrated into many kinds of hardware, e.g. television system, stereo system, surveillance system or fire protection system. The main structure is similar to that described above and redundant description is not given herein.

In conclusion, the present disclosure provides a sound-modulating device capable of playing a music segment, generating a low-frequency audio signal and/or generating a high-frequency repellent audio signal in response to specific state to achieve relieving feeling, eliminating low-frequency noise and/or repelling people in corresponding conditions.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A sound-modulating device used in a confined space, a door at an entrance of the confined space being controlled by a control circuit to be opened or closed, the sound-modulating device comprising:
   an event detector for detecting an event representing that at least one client is present in the confined space and the door closing duration exceeds a predetermined time period due to control failure or power failure and generating a trigger signal in response to the detected event; and
   an audio module in communication with the event detector, for playing a music segment in response to the trigger signal, frequencies of the music segment ranging from 20 Hz to 20000 Hz and intensities of the music segment being smaller than or equal to 75 dB.

2. The sound-modulating device according to claim 1, wherein the event detector comprises a motion detector for detecting whether a client is present in the confined space.

3. The sound-modulating device according to claim 1, wherein the confined space is an elevator cage and the event detector comprises:
   a motion detector for detecting whether a client is present in the elevator cage; and
   a timer for detecting a door closing duration.

4. The sound-modulating device according to claim 1, wherein the event detector informs the audio module to stop playing the music segment after the event ends.

5. The sound-modulating device according to claim 1, wherein the audio module comprises:
   a speaker;
   a storage unit for storing at least one music file; and
   an audio player module in communication with the event detector, the storage unit and the speaker for selecting and receiving one music file from the storage unit and playing the music segment corresponding to the music file through the speaker in response to the trigger signal generated by the event detector.

6. The sound-modulating device according to claim 1, further comprising:
   a low-frequency noise detector for detecting low-frequency noise and generating a first modulating signal in response to the detected low-frequency noise; and
   an automatic actuator issuing a second modulating signal in response to a predetermined state,
   wherein the audio module is in communication with the low-frequency noise detector and the automatic actuator, for generating a low-frequency audio signal for eliminating the low-frequency noise in response to the first modulating signal and generating a high-frequency repellent audio signal in response to the second modulating signal, the low-frequency audio signal having a frequency ranging from 20 Hz to 350 Hz, the high-frequency repellent audio signal having a frequency greater than or equal to 8000 Hz.

7. The sound-modulating device according to claim 6, wherein the first modulating signal generated by the low-frequency noise detector and the low-frequency noise have similar waveforms in antiphase.

8. The sound-modulating device according to claim 6, wherein the automatic actuator comprises a motion detector for detecting whether an object is moving within a specific region and generating the second modulating signal if the predetermined state is met according to the detected moving object.

9. The sound-modulating device according to claim 6, wherein the automatic actuator comprises a timer for issuing the second modulating signal if the predetermined state representing a specific period of time is met.

10. The sound-modulating device according to claim 6, wherein the high-frequency repellent audio signal having an intensity smaller than or equal to 60 dB.

11. The sound-modulating device according to claim 1, further comprising:
   a low-frequency noise detector for detecting low-frequency noise and generating a first modulating signal in response to the detected low-frequency noise,
   wherein the audio module is in communication with the low-frequency noise detector, for generating a low-frequency audio signal for eliminating the low-frequency noise in response to the first modulating signal, the low-frequency audio signal having a frequency ranging from 20 Hz to 350 Hz.

12. The sound-modulating device according to claim 11, wherein the first modulating signal generated by the low-frequency noise detector and the low-frequency noise have similar waveforms in antiphase.

13. The sound-modulating device according to claim 1, further comprising:
   an automatic actuator issuing a second modulating signal in response to a predetermined state,
   wherein the audio module is in communication with the automatic actuator, for generating a high-frequency repellent audio signal in response to the second modulating signal, the high-frequency repellent audio signal having a frequency greater than or equal to 8000 Hz and having an intensity smaller than or equal to 60 dB.

14. The sound-modulating device according to claim 13, wherein the automatic actuator comprises a motion detector for detecting whether an object is moving within a specific region and generating the second modulating signal if the predetermined state is met according to the detected moving object.

15. The sound-modulating device according to claim 13, wherein the automatic actuator comprises a timer for issuing the second modulating signal if the predetermined state representing a specific period of time is met.

* * * * *